(12) United States Patent
Kim et al.

(10) Patent No.: US 12,511,209 B2
(45) Date of Patent: Dec. 30, 2025

(54) ISOLATED DIAGNOSIS OF SOURCE OF ERROR USING CONTROL PANEL CIRCUITRY

(71) Applicant: Hewlett-Packard Development Company, L.P., Spring, TX (US)

(72) Inventors: Jeongphil Kim, Seongnam Si (KR); Robert Mejia, Boise, ID (US); David Lance Spaulding, Boise, ID (US); Dong Woo Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 7 days.

(21) Appl. No.: 18/696,124

(22) PCT Filed: Oct. 1, 2021

(86) PCT No.: PCT/US2021/053075
§ 371 (c)(1),
(2) Date: Mar. 27, 2024

(87) PCT Pub. No.: WO2023/055386
PCT Pub. Date: Apr. 6, 2023

(65) Prior Publication Data
US 2024/0403179 A1 Dec. 5, 2024

(51) Int. Cl.
*H04N 17/00* (2006.01)
*G06F 11/27* (2006.01)
*G06F 11/32* (2006.01)

(52) U.S. Cl.
CPC ............ *G06F 11/27* (2013.01); *G06F 11/321* (2013.01); *H04N 17/00* (2013.01)

(58) Field of Classification Search
CPC ........ G06F 11/26; G06F 11/27; G06F 11/321; H04N 17/004; H04N 17/04; H04N 17/045;
(Continued)

(56) References Cited

U.S. PATENT DOCUMENTS 6,313,873 B1 * 11/2001 Lee ...................... H04N 17/045
348/569
9,164,660 B2 * 10/2015 Jung ................... H04L 12/2825
(Continued)

FOREIGN PATENT DOCUMENTS

| JP | 2008-306334 A | 12/2008 |
| JP | 2013-190164 A | 9/2013 |
| WO | 2006/055884 A2 | 5/2006 |

OTHER PUBLICATIONS

Wikipedia's Multiplexer historical version published Sep. 20, 2021 https://en.wikipedia.org/w/index.php?title=Multiplexer&oldid=1045426376 (Year: 2021).*

(Continued)

*Primary Examiner* — Joseph O Schell
(74) *Attorney, Agent, or Firm* — Foley & Lardner LLP

(57) ABSTRACT

An example image forming apparatus includes a control panel and a processor. The control panel includes a liquid crystal display, a touch screen, a microcontroller, a multiplexer, a coder-decoder, and a speaker. The processor is to control the speaker. Based on a selection of a diagnosis mode, the microcontroller is to interrupt the control of the output of the speaker by the processor, change a state of the multiplexer, and perform a diagnosis by controlling the speaker to output a sound based on receipt of an input on the touch screen.

14 Claims, 7 Drawing Sheets

(58) Field of Classification Search
CPC .............. H04N 17/06; H04N 21/4424; H04N 21/4425; H04N 21/44016; H04L 43/08; H04L 43/0817
See application file for complete search history.

(56) References Cited

U.S. PATENT DOCUMENTS

| | | | |
|---|---|---|---|
| 2003/0152904 A1* | 8/2003 | Doty, Jr. | G09B 7/00 434/350 |
| 2007/0079199 A1 | 4/2007 | Chorn et al. | |
| 2009/0089616 A1* | 4/2009 | Chen | G06F 11/2268 714/25 |
| 2011/0249841 A1* | 10/2011 | Corti | H04R 25/70 381/315 |
| 2014/0335794 A1* | 11/2014 | Forouzan | H04M 3/24 455/67.11 |
| 2015/0339014 A1* | 11/2015 | Jung | H04L 12/2825 715/772 |
| 2016/0055778 A1* | 2/2016 | Kim | G09G 3/2003 345/618 |
| 2018/0329722 A1* | 11/2018 | Nguyen | G06Q 30/016 |
| 2019/0121647 A1 | 4/2019 | Por | |

OTHER PUBLICATIONS

Wikipedia's Audio Codec historical version published Jul. 1, 2021 https://en.wikipedia.org/w/index.php?title=Audio_codec&oldid=1031337626 (Year: 2021).*

* cited by examiner

ISOLATED DIAGNOSIS OF SOURCE OF ERROR USING CONTROL PANEL CIRCUITRY

BACKGROUND

A control panel of a device, such as an image forming apparatus, may include a speaker and a coder-decoder (CODEC) to output a sound. In that case, the CODEC may receive an audio signal from a formatter of a host controller Such an arrangement allows the control panel to provide an expansive audio selection and output.

BRIEF DESCRIPTION OF THE DRAWINGS

Various examples will be described below by referring to the following figures.

DETAILED DESCRIPTION

Figure 1:
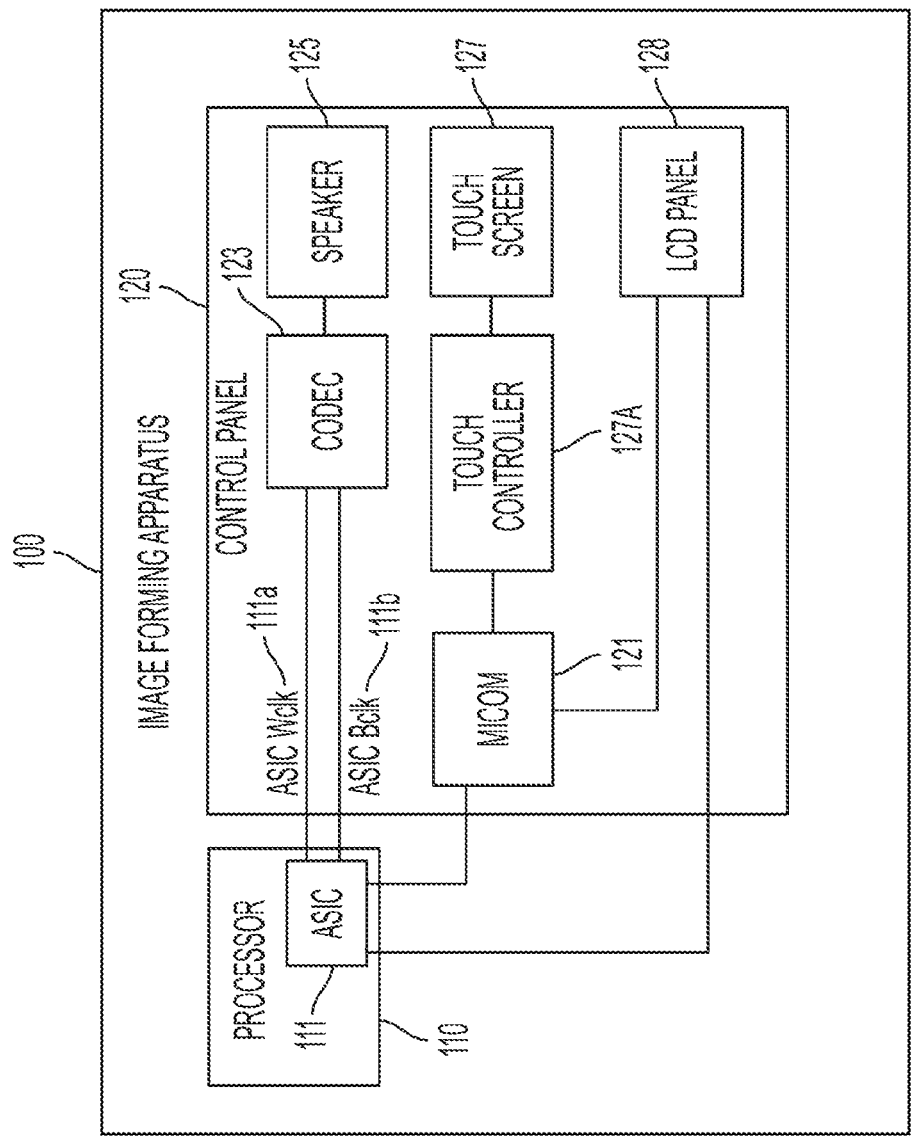
FIG. 1 illustrates an image forming apparatus including a control panel having a coder-decoder to receive an audio signal from a processor, according to an example.

Hereinafter, various examples will be described with reference to the drawings, Like reference numerals in the specification and the drawings denote like elements, and thus a redundant description may be omitted.

A device such as an image forming apparatus may include a control panel having a speaker. The speaker may output a sound such as a beep, a tone, etc. in response to an input, such as a user selection of a function, a menu, etc. that is received on an input device, such as a touch screen, a keyboard, etc. Based on the type of sounds that may be output, the speaker may be controlled using a pulse width modulated (pwm) signal generated by a controller located at the control panel.

To enhance the sounds available for output by the speaker and provide a fuller audio experience, the control panel may include a coder-decoder (CODEC) to output an analog sound signal to the speaker. The CODEC may receive a digital audio signal from an audio function block of a formatter located on a processor or host controller that is separate from the control panel. The CODEC may decode the received digital audio signal to produce an analog sound signal and output the analog sound signal to the speaker. In that case, the digital audio signal provided from the audio function block of the formatter is more complex than the pwm signal output from the MICOM such that the fuller audio experience may be provided.

FIG. 1 illustrates an image forming apparatus including a control panel having a coder-decoder to receive an audio signal from a processor, according to an example.

Referring to FIG. 1, an image forming apparatus 100 may include a processor 110 and a control panel 120. The processor 110 may include an application specific integrated circuit (ASIC) 111 (e.g., a formatter) including an audio function block to output a digital audio signal. The control panel 120 may include a micro-computer (MICOM) 121 (e.g., a microcontroller, a system-on-chip (SOC), etc.), a coder-decoder (CODEC) 123, a speaker 125, a touch screen 127, a touch controller 127A, and a liquid crystal display (LCD) panel 128.

The MICOM 121 is to provide control of components located at the control panel 120 and facilitate communication between components located at the control panel 120 and the processor 110, such as communication between components located at the control panel 120 and the ASIC 111. For example, the MICOM 121 may control an operation of a backlight (not shown), control a power sequencing for the LCD panel 128, determine a status of components in the control panel 120, receive and forward communication signals between the processor 110 or the ASIC 111 and components located at the control panel 120, etc.

The CODEC 123 is to receive a digital audio signal from the ASIC 111 of the processor 110, decode the received digital audio signal, and output an analog sound signal to the speaker 125. As an example, the CODEC 123 may receive a digital audio signal based on an inter-integrated circuit (I2C) or an enhanced I2C (eI2C) protocol and a clock signal based on an inter-integrated sound (I2S) protocol. In that case, the I2S clock signal may include a word clock (Wclk) 111a and a bit clock (Bclk) 111b. Although not illustrated in FIG. 1, in other examples and depending on a type or a specification of the ASIC 111 and the CODEC 123, the I2S clock signal may further include a master clock (Mclk). For convenience in FIG. 1, the Wclk 111a and Bclk 111b provided by the ASIC 111 to the CODEC 123 are illustrated while the Mclk and the I2S data signal are not. Based on receipt of the clock signal (e.g., the Wclk 111a and Bclk 111b) provided by the ASIC 111, the CODEC 123 functions to decode the I2S digital audio signal received from the ASIC 111 and provide an analog sound signal to the speaker 125. Based on receipt of the analog sound signal output by the CODEC 123, the speaker 125 is to output a sound.

The touch screen 127 is to receive a user input such as a touch, a press, a hold, a swipe, etc. on a surface of the touch screen 127. The touch screen 127 may be located proximate the LCD panel 128 to display an image generated by the LCD panel 128 to a user. As an example, the touch screen 127 may include a transparent layer including sensors to receive and detect a location of the user input relative to the image displayed by the LCD panel 128. The touch screen 127 may provide a signal corresponding to the detected input to the MICOM 121 through the touch controller 127A. As an example, based on the touch screen 127 receiving a user input, the touch controller 127A may receive a signal from the touch screen 127 corresponding to the user input and forward the signal to the MICOM 121. The touch controller 127A may also receive a signal, a command, etc. from the MICOM 121.

The LCD panel 128 is to display an image based on a signal received from the ASIC 111 or a signal received from the MICOM 121. As an example, the LCD panel 128 may display an image including a status of the image forming apparatus 100, an instruction for operating the image forming apparatus 100, a menu for controlling the image forming apparatus 100 including a plurality of items selectable by the user, etc. The LCD panel 128 may be located proximate the backlight (not shown) and the touch screen 127 (e.g., located between the backlight and the touch screen 127) such that the image displayed by the LCD panel 128 is viewable through the touch screen 127. In that case, the touch screen 127 may output a signal to the touch controller 127A as to a location of a received user input relative to the image displayed by the LCD panel 128.

During operation of the image forming apparatus 100 of FIG. 1, an error may occur in which a sound is not output by the speaker 125. In that case, a user may desire to find a source of the error and replace or repair a damaged or malfunctioning component. However, because the CODEC 123 uses the I2S clock signals received from the ASIC 111 to generate an analog sound signal, it is difficult to determine if the error has occurred based on a malfunctioning component at the control panel 120, based on a malfunctioning interconnection between the processor 110 and the control panel 120, or based on a malfunctioning component at the processor 110. For example, it is difficult to determine if the ASIC 111 has malfunctioned and is unable to output one or both of the I2S clock signals or the digital audio signal, if the interconnection between the processor 110 and the control panel 120 has malfunctioned, or if the CODEC 123 has malfunctioned despite receiving the I2S clock signals and the digital audio signal from the ASIC 111. In that case, the control panel 120 may be replaced in its entirety despite the error occurring at the processor 110 or at the interconnection between the processor 110 and the control panel 120, which may cause an unnecessary expense and incur unnecessary time for the replacement.

Figure 2:
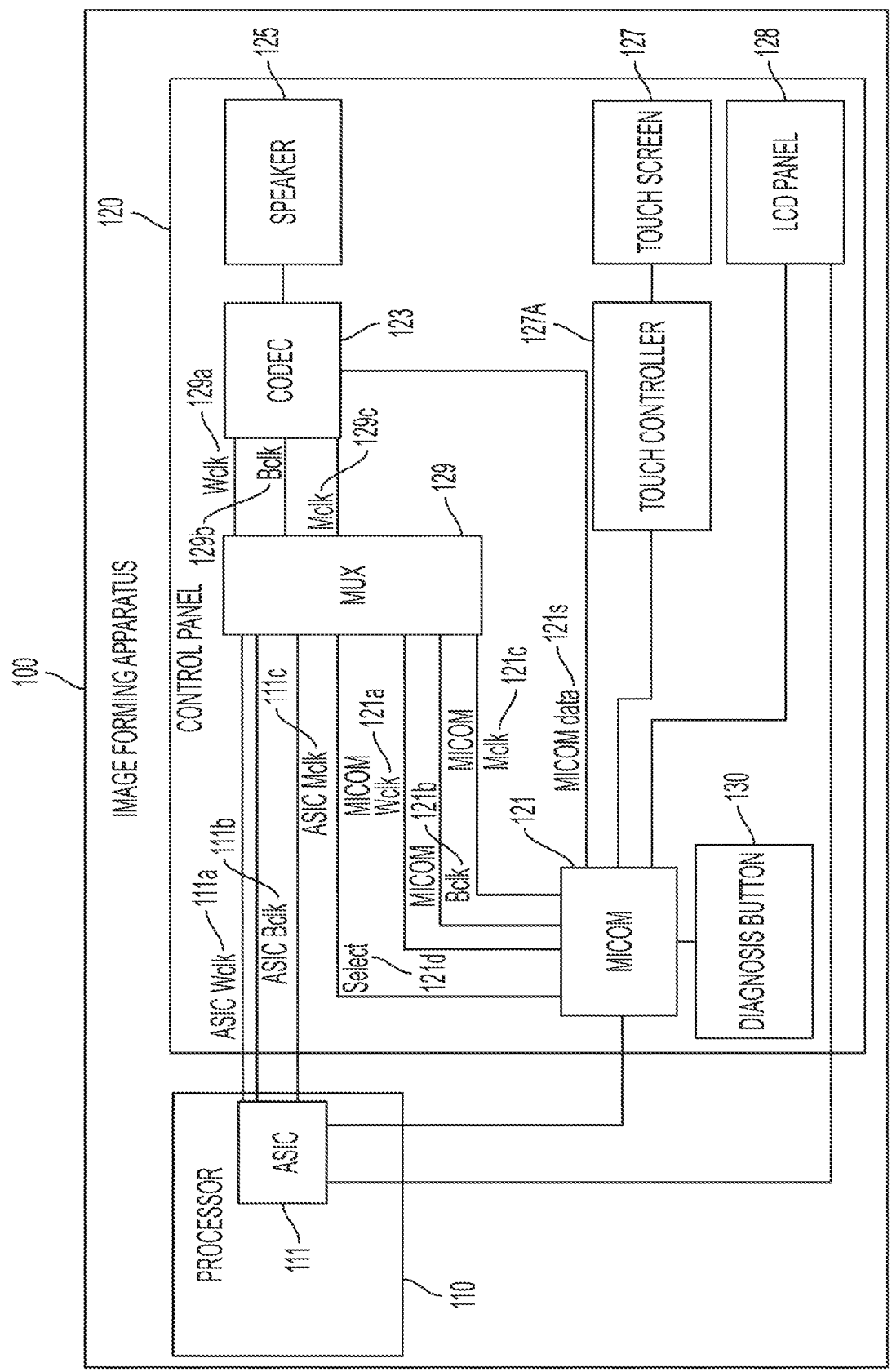
FIG. 2 illustrates an image forming apparatus including a control panel to diagnose a source of an error, according to an example.

FIG. 2 illustrates an image forming apparatus including a control panel to diagnose a source of an error, according to an example.

Referring to FIG. 2, the image forming apparatus 100 includes the processor 110 and the control panel 120. The processor 110 includes the ASIC 111. The control panel 120 includes the MICOM 121, the CODEC 123, the speaker 125, the touch screen 127, the touch controller 127A, and the LCD panel 128, a repetitive description of which will not be provided here for sake of brevity. The control panel 120 also includes a multiplexer (MUX) 129 and a diagnosis button 130. Although not shown, the processor 110 and the control panel 120 may each include additional components such as a power source, a memory, etc.

The MUX 129 is to selectively provide a received clock signal to the CODEC 123. In more detail, the MUX 129 is to receive a first set of clock signals and a second set of clock signals and selectively provide either the first set or the second set of clock signals as an output clock signal to the CODEC 123. In the example of FIG. 2, the MUX 129 is a triple channel multiplexer.

As illustrated in FIG. 2, the MUX 129 is to receive the Wclk 111a and the Bclk 111b from the ASIC 111 and is to receive a Wclk 121a and a Bclk 121b from the MICOM 121. In the example of FIG. 2, the CODEC 123 further receives an Mclk 111c from the ASIC 111 and an Mclk 121c from the MICOM 121. That is, a specification or a type of the CODEC 123 used in the example of FIG. 2 outputs an analog sound signal with an internal tone generator using a Wclk, a Bclk, and an Mclk.

The MUX 129 is also to receive a select signal 121d that is provided by the MICOM 121. The select signal 121d is to control the MUX 129 to output either the Wclk 111a, the Bclk 111b, and the Mclk 111c received from the ASIC 111 or to output the Wclk 121a, the Bclk 121b, and the Mclk 121c received from the MICOM 121. That is, the MUX 129 may output a Wclk signal 129a, a Bclk signal 129b, and an Mclk signal 129c based on selection of either the Wclk 111a, the Bclk 111b, and the Mclk 111c received from the ASIC 111 or the Wclk 121a, the Bclk 121b, and the Mclk 121c received from the MICOM 121. In an example, the select signal 121d may be a binary signal (i.e., high/low) that switches the MUX 129 between outputting the Wclk 111a, the Bclk 111b, and the Mclk 111c received from the ASIC 111 and outputting the Wclk 121a, the Bclk 121b, and the Mclk 121c received from the MICOM 121.

The MICOM 121 is to output the select signal 121d to the MUX 129 and to output a data signal 121s to the CODEC 123. The data signal 121s output by the MICOM 121 may include a digital audio signal. Based on receipt of the digital audio signal from the MICOM 121, the CODEC 123 may decode the digital audio signal and output an analog sound signal to the speaker 125. The speaker 125 may output a sound based on receiving the analog sound signal from the CODEC 123. The data signal 121s may also include commands, instructions, etc. to control the CODEC 123.

The diagnosis button 130 may be located on the control panel 120. For example, the diagnosis button 130 may be located on a back side of the control panel 120, the back side being opposite a front side of the control panel 120 on which the touch screen 127 is located. In other examples, the diagnosis button 130 may be provided on the front side of the control panel 120 at a location that does not interfere with the touch screen 127 or another display of the control panel 120 (e.g., an indicator light, etc.).

During an operation of the image forming apparatus 100, an error may occur in which a sound is not output by the speaker 125. For example, during an operation of the image forming apparatus 100, an event may occur that is programmed to result in a sound being output by the speaker 125, but the sound may not be output. To diagnose the error, a user, an administrator, a service technician, etc. may select the diagnosis button 130. For example, the selection of the diagnosis button 130 may include a press received on the diagnosis button 130.

The selection of the diagnosis button 130 provides an input signal (e.g., an interrupt signal) to the MICOM 121. In an example, the selection of the diagnosis button 130 may cause the MICOM 121 to initiate a diagnosis mode. In the diagnosis mode, control of the components of the control panel 120 is generally transferred from the processor 110 to the MICOM 121. Example operations of the image forming apparatus 100 in the diagnosis mode are described below.

Based on a selection of the diagnosis button 130, the MICOM 121 may initiate the diagnosis mode by providing a control signal to the CODEC 123. The control signal provided from the MICOM 121 to the CODEC 123 may include an instruction to disable or otherwise ignore signals, commands, instructions, or other inputs that are received from the processor 110, including the ASIC 111. In an example, the control signal provided from the MICOM 121 to the CODEC 123 may write an instruction to a register of the CODEC 123 to disable communication between the CODEC 123 and the processor 110. Based on the control signal received from the MICOM 121, the CODEC 123 would disable or otherwise ignore a digital audio signal received from the ASIC 111.

The MICOM 121 may also request or instruct the CODEC 123 to provide a status of the CODEC 123 to the MICOM 121. For example, the MICOM 121 may request the CODEC 123 to provide a state of registers of the CODEC 123 at the initiation of the diagnosis mode and the MICOM 121 may record the state of the registers. The state of the registers of the CODEC 123 at the initiation of the diagnosis mode may be considered an active state of the CODEC 123. Upon completion of the diagnosis mode, the registers of the CODEC 123 may be returned to the same state as at the initiation of the diagnosis mode (i.e., returned to the active state).

The MICOM 121 may further initiate the diagnosis mode by changing a state of the MUX 129. For example, before initiating the diagnosis mode, the MUX 129 may be in a state (e.g., a low state) in which the Wclk 111a, the Bclk 111b, and the Mclk 111c output by the ASIC 111 and received at the MUX 129 are selected for output by the MUX 129 and provided to the CODEC 123. Based on entering the diagnosis mode, the MICOM 121 changes an output of the select signal 121d (e.g., changes from low to high) to change the state of the MUX 129 (e.g., to a high state). That is, based on the initiation of the diagnosis mode, the select signal 121d may be changed to control the MUX 129 to select the Wclk 121a, the Bclk 121b, and the Mclk 121c received from the MICOM 121, for output by the MUX 129 to the CODEC 123.

The initiating of the diagnosis mode may also include providing a control signal from the MICOM 121 to the touch controller 127A and may include providing a control signal from the MICOM 121 to the LCD panel 128. The control signal provided from the MICOM 121 to the touch controller 127A may include an instruction to disable or otherwise ignore signals, commands, instructions, or other inputs that are received from the processor 110. In that case, the touch controller 127A may be controlled by the MICOM 121. The MICOM 121 may also request or instruct the touch controller 127A to provide a status of the touch screen 127 to the MICOM 121 at the initiation of the diagnosis mode (i.e., the active state) and the MICOM 121 may record the information. Similarly, the control signal provided from the MICOM 121 to the LCD panel 128 may include an instruction to disable or otherwise ignore signals, commands, instructions, or other inputs that are received by the LCD panel 128 from the processor 110. In that case, the LCD panel 128 may be controlled by the MICOM 121. For example, the MICOM 121 may request the LCD panel 128 to provide information regarding an output of the LCD and other state information at the initiation of the diagnosis mode (i.e., the active state) and the MICOM 121 may record the information. Upon completion of the diagnosis mode, the touch screen 127 and the LCD panel 128 may each be returned to the same state as at the initiation of the diagnosis mode (i.e., returned to the active state).

The control signal provided to the LCD panel 128 from the MICOM 121 may also instruct the LCD panel 128 to display a test pattern. In an example, the test pattern may include sequentially displaying primary colors (e.g., R, G, B) on the LCD panel 128, displaying a test pattern including bars of different colors, etc. Based on the LCD panel 128 correctly displaying the test pattern, a user may diagnose that the LCD panel 128 is operating without an error.

In the diagnosis mode, the touch controller 127A may be controlled to output a signal upon receipt of a user input on the touch screen 127. For example, in the diagnosis mode, the touch controller 127A may be controlled such that, based on receiving a user input on the touch screen 127, such as a touch, a swipe, etc., the touch controller 127A outputs a user input signal to the MICOM 121 indicating that the user input has been received. Based on receiving the user input signal from the touch controller 127A, the MICOM 121 may output a digital audio signal to the CODEC 123, for example as the data signal 121s. In an example, the MICOM 121 may provide a digital audio signal to the CODEC 123 to control a tone, a duration, etc. of a sound to be output by the speaker 125. Based on receipt of the digital audio signal, the CODEC 123 may generate an analog sound signal and output the analog sound signal to the speaker 125. In turn, the speaker 125 may output a sound based on receiving the analog sound signal. Thus, in the diagnosis mode, a user may diagnose that the touch screen 127 and the touch controller 127A are operating without an error based on the speaker 125 outputting a sound (e.g., a tone, etc.) upon receipt of a user input on the touch screen 127.

During the diagnosis mode, the MICOM 121, based on receipt of a user input signal from the touch controller 127A, may output a digital audio signal to the CODEC 123 such that the speaker 125 outputs a sound, and the LCD panel 128 may continue to display a test pattern. The diagnosis mode may terminate upon an expiration of a certain time after receipt of the user input signal from the touch controller 127A or upon a subsequent selection of the diagnosis button 130. For example, the diagnosis mode may terminate if a user input signal is not received from the touch controller 127A for 10 seconds, or upon a second press of the diagnosis button 130.

Referring again to the example of FIG. 1, it may be difficult to diagnose a source of an error because the CODEC 123 uses a clock signal (e.g., a Wclk and a Bclk) to output an analog sound signal to the speaker 125. In the example of FIG. 2, although the signaling between the ASIC 111 and the CODEC 123, including the Wclk 111a, the Bclk 111b, and the Mclk 111c is interrupted by the MICOM 121 during a diagnosis mode, the CODEC 123 remains able to output an analog sound signal by using the Wclk 121a, the Bclk 121b, and the Mclk 121c that are provided by the MICOM 121. In that case, a user may enter the diagnosis mode and diagnose a source of an error. For example, in a case in which the control panel 120 enters the diagnosis mode, the LCD panel 128 may display a test pattern and a user may provide an input on the touch screen 127 to detect if a sound is output by the speaker 125. If the test pattern is displayed by the LCD panel 128 and the sound is output by the speaker 125 based on receipt of a user input on the touch screen 127, the user may diagnose that the MICOM 121, the CODEC 123, the speaker 125, the touch screen 127, the touch controller 127A, and the LCD panel 128 operate properly and that the source of the error is not the control panel 120. In that case, an unnecessary removal and disposal of the control panel 120 may be avoided based on diagnosing that the source of the error is the processor 110. On the other hand, if the sound is not output by the speaker 125 or the test pattern is not displayed by the LCD panel 128, the user may diagnose that the MICOM 121, the CODEC 123, the speaker 125, the touch screen 127, the touch controller 127A, or the LCD panel 128 does not operate properly and that the source of the error is the control panel 120.

Figure 3:
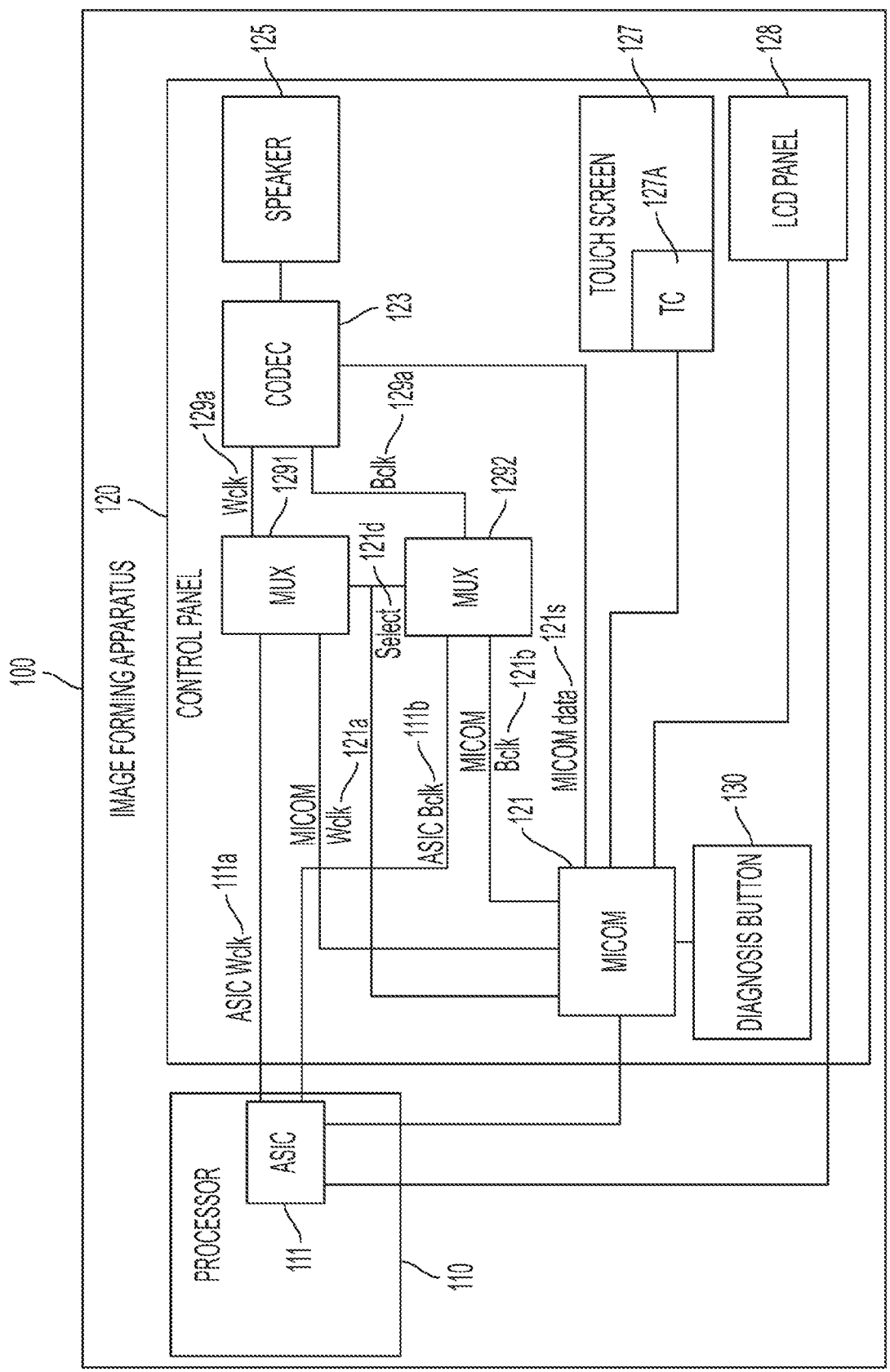
FIG. 3 illustrates an image forming apparatus including a control panel having two single channel multiplexers, according to an example.

FIG. 3 illustrates an image forming apparatus including a control panel having two single channel multiplexers according to an example.

Referring to FIG. 3, the image forming apparatus 100 includes the processor 110 and the control panel 120. The processor 110 includes the ASIC 111 and the control panel 120 includes the MICOM 121, the CODEC 123, the speaker 125, the touch screen 127, the LCD panel 128, and the diagnosis button 130, a repetitive description of which will not be provided here for sake of brevity. Although not shown, the processor 110 and the control panel 120 may each include additional components such as a power source, a memory, etc.

The example illustrated in FIG. 3 differs from the example illustrated in FIG. 2 in that the clock signal used by the CODEC 123 includes a Wclk and a Bclk but does not include an Mclk. That is, a specification or a type of the CODEC 123 used in the example of FIG. 3 outputs an analog sound signal using a Wclk and a Bclk but does not use an Mclk. Also, the example illustrated in FIG. 3 includes a single channel MUX for selectively controlling to output one of two received input signals. That is, rather than include a dual channel multiplexer, the control panel 120 of FIG. 3 includes a first single channel MUX 1291 and a second single channel MUX 1292.

As illustrated in FIG. 3, the first single channel MUX 1291 is to receive the Wclk 111a from the ASIC 111 and the Wclk 121a from the MICOM 121 and output the Wclk signal 129a to the CODEC 123. The second single channel MUX 1292 is to receive the Bclk 111b from the ASIC 111 and the Bclk 121b from the MICOM 121 and output the Bclk signal 129b to the CODEC 123. The select signal 121d output from the MICOM 121 is provided to both the first single channel MUX 1291 and the second single channel MUX 1292. The select signal 121d may be a binary signal (i.e., high/low) that switches both the first single channel MUX 1291 and the second single channel MUX 1292. In that case, both the first single channel MUX 1291 and the second single channel MUX 1292 are controlled by the MICOM 121 to be in either the high state or the low state and selectively output a clock signal to the CODEC 123. Example operations of the image forming apparatus 100 of FIG. 3 upon selection of the diagnosis button 130 (i.e., a diagnosis mode) are described above are not repeated here for sake of brevity.

In the example of FIG. 3, the touch controller 127A is included as a component within the touch screen 127. In other examples, the touch controller 127A may be provided as a separate component from the touch screen 127, such as the example illustrated in FIG. 2.

Figure 4:
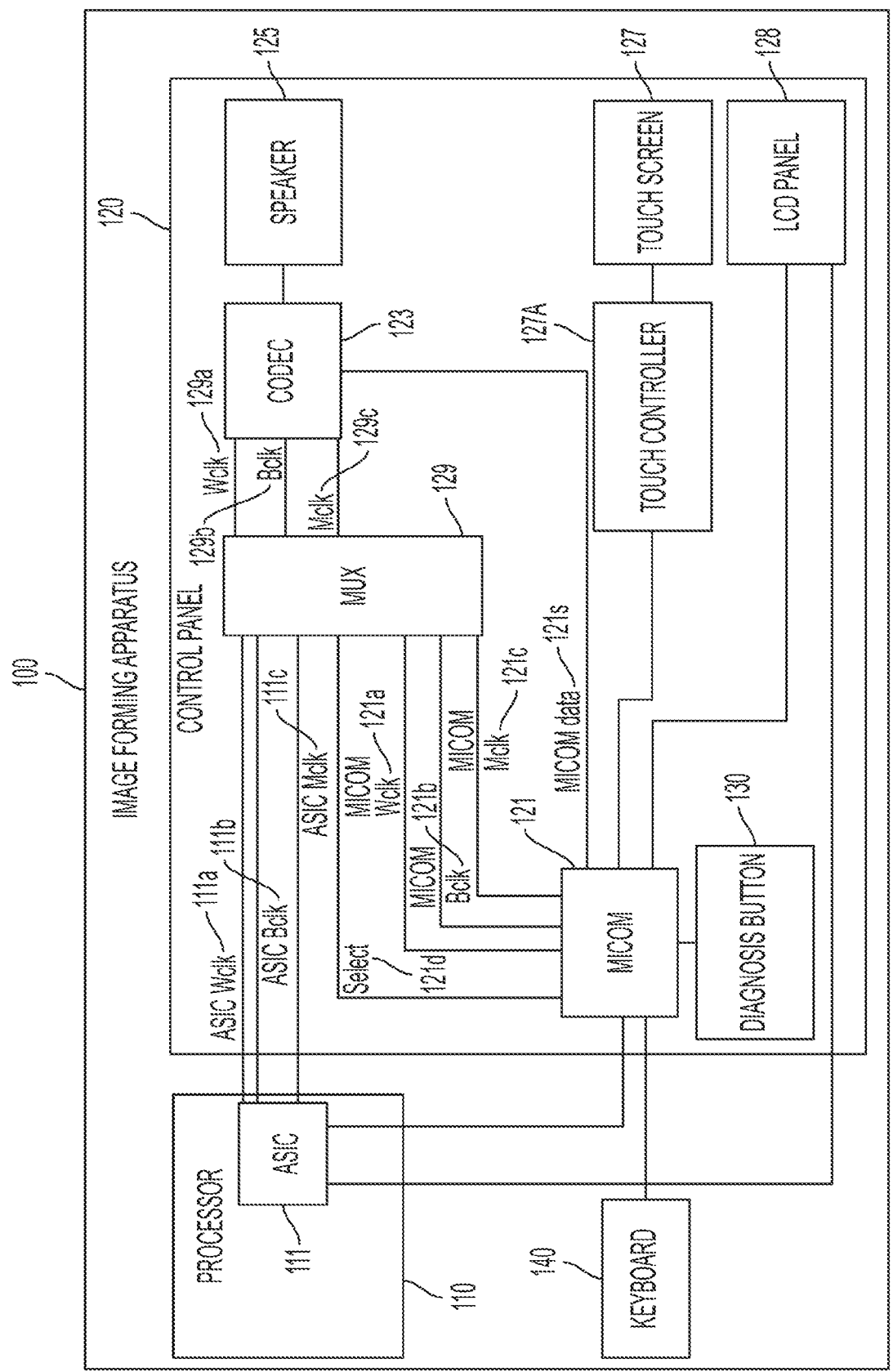
FIG. 4 illustrates an image forming apparatus including a keyboard, according to an example.

FIG. 4 illustrates an image forming apparatus including a keyboard according to an example.

Referring to FIG. 4, the image forming apparatus 100 includes the processor 110 and the control panel 120. The processor 110 includes the ASIC 111. The control panel 120 includes the MICOM 121, the CODEC 123, the speaker 125, the touch screen 127, the touch controller 127A, the LCD panel 128, the MUX 129, and the diagnosis button 130, a repetitive description of which will not be provided here for sake of brevity. The image forming apparatus 100 also includes a keyboard 140. Although not shown, the processor 110 and the control panel 120 may each include additional components such as a power source, a memory, etc.

The keyboard 140 may include a plurality of keys, buttons, etc. to receive a user input. In an example, the keyboard 140 may be a qwerty keyboard. Although the keyboard 140 is illustrated as separate from the control panel 120 in FIG. 4, this is only an example and in various implementations, the keyboard 140 may be located on or otherwise provided with the control panel 120. During an operation, a user may provide an input using the keyboard 140, and the keyboard 140 may provide an output signal corresponding to the received input to the MICOM 121. The MICOM 121 may in turn provide an input received from the keyboard 140 to the processor 110 as well as providing signaling received from the processor 110 to the keyboard 140.

The image forming apparatus 100 of FIG. 4 may enter a diagnosis mode upon a selection of the diagnosis button 130. In that case, the MICOM 121 may provide a control signal to the keyboard 140. The control signal provided from the MICOM 121 to the keyboard 140 may include an instruction to disable or otherwise ignore signals, commands, instructions, or other inputs that are received by the keyboard 140 from the processor 110. In that case, the keyboard 140 may be controlled by the MICOM 121. The MICOM 121 may also request or instruct the keyboard 140 to provide status information of the keyboard 140 at the initiation of the diagnosis mode (i.e., the active state of the keyboard 140) to the MICOM 121 and the MICOM 121 may record the status information. Upon completion of the diagnosis mode, the keyboard 140 may be returned to the same state as at the initiation of the diagnosis mode (i.e., returned to the active state).

In the diagnosis mode, the keyboard 140 may be controlled to output a signal upon receipt of a user input on the keyboard 140. For example, in the diagnosis mode, the keyboard 140 may be controlled such that, based on receiving a user input on the keyboard 140 (i.e., a key touch), the keyboard 140 outputs a user input signal to the MICOM 121 indicating that the user input has been received. Based on receiving the user input signal from the keyboard 140, the MICOM 121 may output a digital audio signal to the CODEC 123, for example as the data signal 121s. In an example, the MICOM 121 may provide a digital audio signal to the CODEC 123 to control a tone, a duration, etc. of a sound to be output by the speaker 125. Based on receipt of the digital audio signal from the MICOM 121, the CODEC 123 may generate an analog sound signal and output the analog sound signal to the speaker 125. In turn, the speaker 125 may output a sound based on receiving the analog sound signal. A user may diagnose that the keyboard 140 operates properly based on the output of the sound from the speaker 125.

Additional and remaining operations of the image forming apparatus 100 in the diagnosis mode (e.g., control signaling, termination, etc.) of FIG. 4 are similar to those described above regarding FIG. 2 and a repetitive description will be avoided here.

Figure 5:
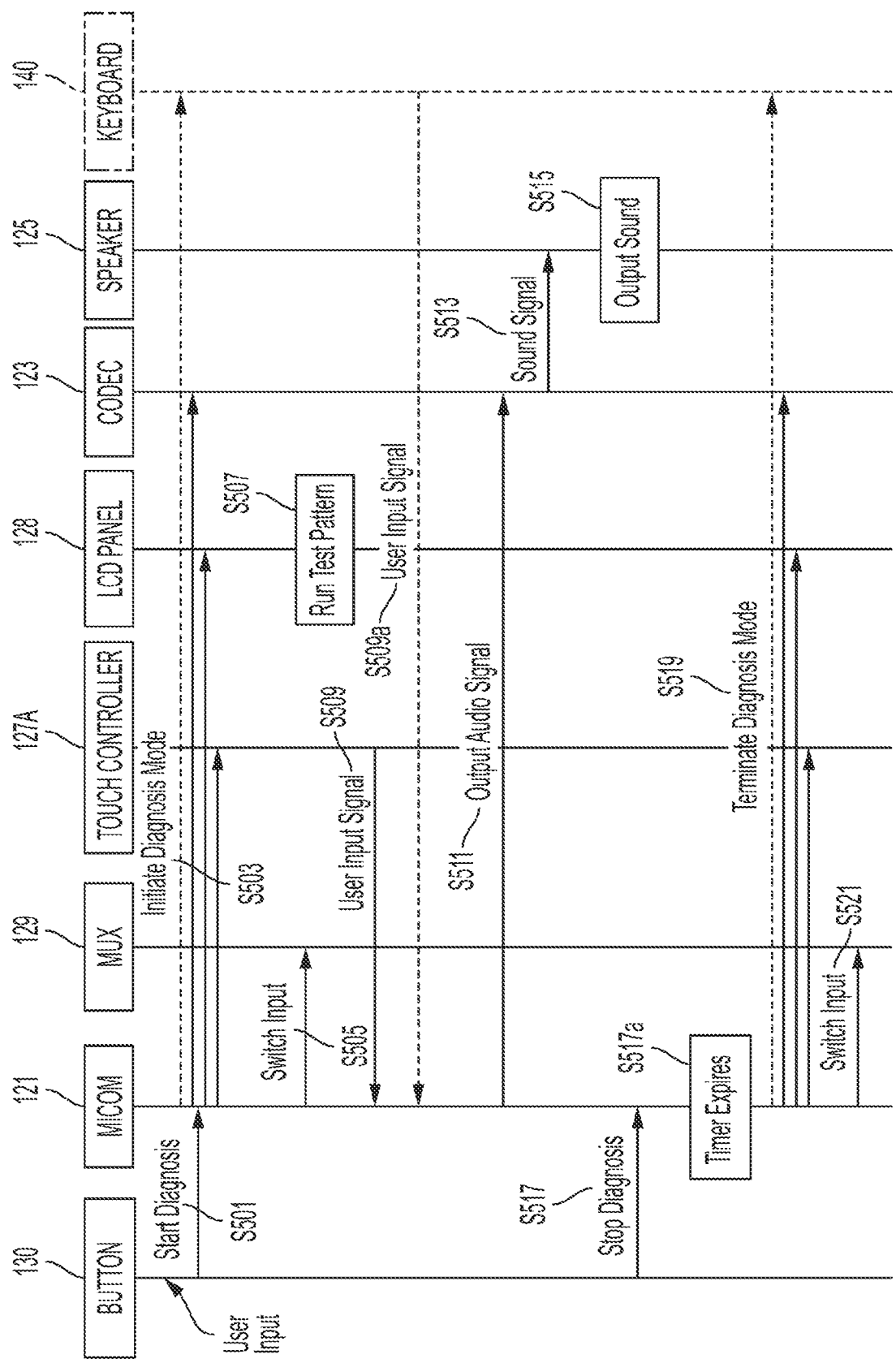
FIG. 5 is a flow diagram of an error diagnosis mode, according to an example.

FIG. 5 is a flow diagram of an error diagnosis mode according to an example.

Referring to FIG. 5, based on the occurrence of an error at the control panel 120, for example if a sound is not output by the speaker 125 as expected, a user may enter a diagnosis mode by selecting the diagnosis button 130. The user input of selecting the diagnosis button 130 provides a signal to the MICOM 121 to start the diagnosis in operation 8501. Based on receipt of the diagnosis start signal in operation S501, the MICOM 121 initiates the diagnosis mode by transmitting control signals to the CODEC 123, the touch controller 127A, and the LCD panel 128 in operation 8503. If the keyboard 140 is also included in the image forming apparatus 100, the MICOM 121 initiates the diagnosis mode by transmitting control signals to the keyboard 140 in operation S503. The control signals transmitted by the MICOM 121 to the CODEC 123, the touch controller 127A, the LCD panel 128, and the keyboard 140 may include signals to interrupt control of the CODEC 123, the touch controller 127A, the LCD panel 128, and the keyboard 140 by the processor 110, to request information of an active state of the CODEC 123, the touch screen 127, the LCD panel 128, and the keyboard 140, to control the LCD panel 128, to display a test pattern, etc.

In operation S505, the MICOM 121 transmits a control signal to the MUX 129 to cause a change of state (e.g., low to high) of the MUX 129. In that case, the MUX 129 receives the Wclk 121a and the Bclk 121b from the MICOM 121 and outputs the Wclk 129a and the Bclk 129b to the CODEC 123. Depending on a specification or a type of the CODEC 123, the MUX 129 may also receive the Mclk 121c from the MICOM 121 and output the Mclk 129c to the CODEC 123.

In operation S507, the LCD panel 128 displays a test pattern. In an example, the test pattern may include sequentially displaying primary colors (e.g., R, G, B), displaying a pattern including bars of different colors, etc. Based on the LCD panel 128 correctly displaying the test pattern, a user may diagnose that the LCD panel 128 is operating without an error.

In operation S509, the MICOM 121 may receive a user input signal from the touch controller 127A indicating that a touch or other input has been received by the touch screen 127. In an example in which the image forming apparatus includes the keyboard 140, the MICOM 121 may receive a user input signal from the keyboard 140 indicating that an input (e.g., a keystroke) has been received by the keyboard 140 in operation S509a.

In response to receiving the user input in operation S509 or in operation S509a, the MICOM 121 outputs a digital audio signal to the CODEC 123 in operation S511. In an example, the MICOM 121 may provide a digital audio signal to the CODEC 123 to control a tone, a duration, etc. of a sound to be output by the speaker 125. Based on the received digital audio signal and using the Wclk 129a and the Bclk 129b (or the Wclk 129a, the Bclk 129b, and the Mclk 129c) received from the MUX 129, the CODEC 123 generates an analog sound signal and outputs the analog sound signal to the speaker 125 in operation S513.

In operation S515, the speaker 125 is to output a sound based on the analog sound signal received from the CODEC 123. Based on the speaker 125 outputting the sound, the user may diagnose that the speaker 125, as well as the MICOM 121, the CODEC 123, the touch screen 127, the touch controller 127A, the LCD panel 128, and the keyboard 140 (if provided), are operating without an error. In the alternative, based on the speaker 125 not outputting the sound, the user may diagnose that the speaker 125, the MICOM 121, the CODEC 123, the touch screen 127, the touch controller 127A, the LCD panel 128, or the keyboard 140 (if provided) is operating with an error.

In operation S517, a request to stop the diagnosis mode may be received from the diagnosis button 130. As an example, a user may provide a subsequent input to the diagnosis button 130 such that a signal (e.g., an interrupt signal) is provided from the diagnosis button 130 to the MICOM 121. Alternatively, in operation S517a, the diagnosis mode may be terminated upon expiration of a certain time after receipt of the user input signal from the touch controller 127A or the keyboard 140 (if provided). For example, the diagnosis mode may terminate if a user input signal is not received for 10 seconds.

In operation S519, the MICOM 121 may terminate the diagnosis mode by transmitting control signals to the CODEC 123, the touch controller 127A, the LCD panel 128, and the keyboard 140 (if provided). The control signals provided by the MICOM 121 may include signals, commands, or other information to restore the CODEC 123, the touch screen 127, the LCD panel 128, and the keyboard 140 (if provided) to the active state.

In operation S521, the MICOM 121 transmits a control signal to the MUX 129 to cause a change of state (e.g., high to low) of the MUX 129. In that case, the MUX 129 receives the Wclk 111a and the Bclk 111b from the ASIC 111 and provides the Wclk 129a and the Bclk 129b to the CODEC 123. Depending on a specification or a type of the CODEC 123, the MUX 129 may also receive the Mclk 111c from the ASIC 111 and output the Mclk 129c to the CODEC 123.

Based on the example process illustrated in FIG. 5, a user may operate a control panel 120 in a diagnosis mode to diagnose a source of an error. For example, the user may diagnose that an error has occurred at the processor 110 if a sound is heard from the speaker 125 during the diagnosis mode and may diagnose that an error has occurred at the control panel 120 if a sound is not heard from the speaker 125 during the diagnosis mode.

Figure 6:
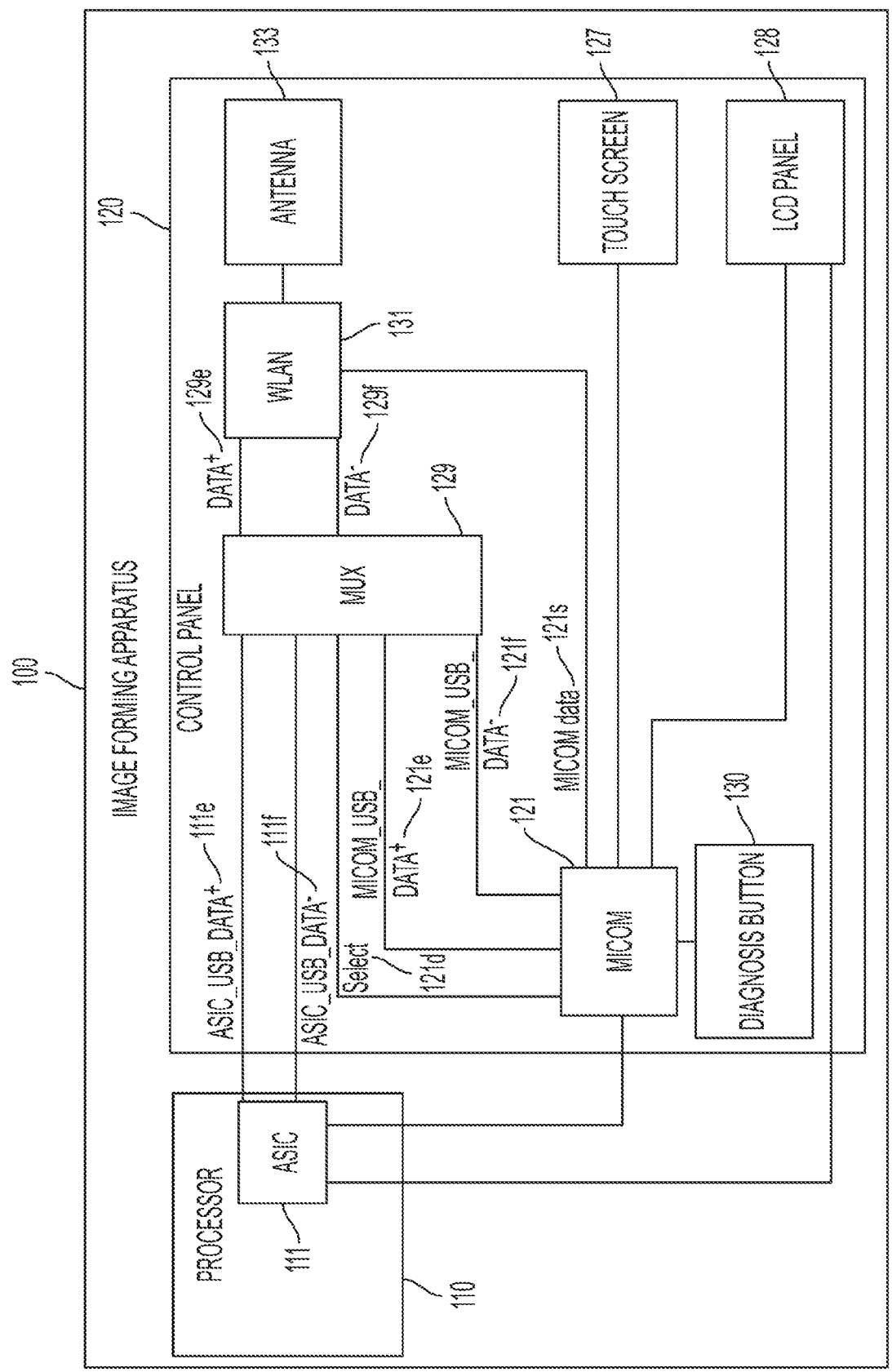
FIG. 6 illustrates an image forming apparatus including a control panel to diagnose a source of an error, according to another example.

FIG. 6 illustrates an image forming apparatus including a control panel to diagnose a source of an error according to another example.

Referring to FIG. 6, the image forming apparatus 100 includes the processor 110 and the control panel 120. The processor 110 includes the ASIC 111. The control panel 120 includes the MICOM 121, the touch screen 127, the LCD panel 128, the MUX 129, and the diagnosis button 130, a repetitive description of which will not be provided here for sake of brevity. The control panel 120 also includes a wireless local area network (WLAN) device 131 and an antenna 133. Although not shown, the processor 110 and the control panel 120 may each include additional components such as a power source, a memory, etc. For example, the control panel 120 may also include the touch controller 127A, which may be implemented as a separate component or together with touch screen 127. Furthermore, the control panel 120 may also include the CODEC 123 and the speaker 125.

In the example of FIG. 6, the MUX 129 is to selectively provide a received data signal to the WLAN device 131. In more detail, the MUX 129 is to receive a first set of data signals and a second set of data signals and selectively provide either the first set or the second set of data signals as an output data signal to the WLAN device 131. In the example of FIG. 6, the MUX 129 is a double channel multiplexer. In other examples, two single channel multiplexers may be used in place of the double channel MUX 129.

As illustrated in FIG. 6, the MUX 129 is to receive a USB_DATA+ signal 111e and a USB_DATA− signal 111f from the ASIC 111 and is to receive a USB_DATA+ signal 121e and a USB_DATA− signal 121f from the MICOM 121. The MUX 129 is also to receive the select signal 121d that is provided by the MICOM 121. The select signal 121d is to control the MUX 129 to output either the USB_DATA+ signal 111e and the USB_DATA− signal 111f received from the ASIC 111 or to output the USB_DATA+ signal 121e and the USB_DATA− signal 121f received from the MICOM 121. That is, the MUX 129 may output a USB_DATA+ signal 129e and a USB_DATA− signal 129f based on selection of either the USB_DATA+ signal 111e and the USB_DATA− signal 111f received from the ASIC 111 or the USB_DATA+ signal 121e and the USB_DATA− signal 121f received from the MICOM 121. In an example, the select signal 121d may be a binary signal (i.e., high/low) that switches the MUX 129 between outputting the USB_DATA+ signal 111e and the USB_DATA− signal 111f received from the ASIC 111 and outputting the USB_DATA+ signal 121e and the USB_DATA− signal 121f received from the MICOM 121.

The MICOM 121 is to output the select signal 121d to the MUX 129 and to output the data signal 121s to the WLAN device 131. The data signal 121s output by the MICOM 121 may include a control signal. Based on receipt of the control signal from the MICOM 121, the WLAN device 131 may control the antenna 133 to output a test signal to diagnose a function of the WLAN device 131 and a transmission capability of the antenna 133. The antenna 133 may output the test signal, which may be received and verified by a user. For example, the user may receive the test signal on a mobile terminal, a desktop terminal, and the like.

During an operation of the image forming apparatus 100, an error may occur in which a signal is not output by the antenna 133. For example, during an operation of the image forming apparatus 100, an event may occur that is programmed to result in a signal being output by the antenna 133, but the signal may not be output. To diagnose the error, a user, an administrator, a service technician, etc. may select the diagnosis button 130 to enter the diagnosis mode.

The MICOM 121 may initiate the diagnosis mode by providing a control signal to the WLAN device 131. The control signal provided from the MICOM 121 to the WLAN device 131 may include an instruction to disable or otherwise ignore signals, commands, instructions, or other inputs that are received from the processor 110, including the ASIC 111.

The MICOM 121 may also request or instruct the WLAN device 131 to provide information regarding a status of the WLAN device 131 to the MICOM 121. The information regarding a status of the WLAN device 131 at the initiation of the diagnosis mode may be considered an active state of the WLAN device 131 and may be recorded by the MICOM 121. Upon completion of the diagnosis mode, the WLAN device 131 may be returned to the same state as at the initiation of the diagnosis mode (i.e., returned to the active state) based on the information regarding a status of the WLAN device 131 obtained at the initiation of the diagnosis mode.

The MICOM 121 may further initiate the diagnosis mode by changing a state of the MUX 129. For example, before initiating the diagnosis mode, the MUX 129 may be in a state (e.g., a low state) in which the USB_DATA+ signal 111$e$ and the USB_DATA− signal 111$f$ output by the ASIC 111 and received at the MUX 129 are selected for output by the MUX 129 and provided to the WLAN device 131. Based on entering the diagnosis mode, the MICOM 121 changes an output of the select signal 121$d$ (e.g., changes from low to high) to change the state of the MUX 129 (e.g., to a high state). That is, based on the initiation of the diagnosis mode, the select signal 121$d$ may be changed to control the MUX 129 to select the USB_DATA+ signal 121$e$ and the USB_DATA− signal 121$f$, received from the MICOM 121, for output by the MUX 129 to the WLAN device 131.

The initiating of the diagnosis mode may also include providing a control signal from the MICOM 121 to the touch screen 127 and providing a control signal from the MICOM 121 to the LCD panel 128. The control signals provided from the MICOM 121 to the touch screen 127 and the LCD panel 128 may include an instruction to disable or otherwise ignore signals, commands, instructions, or other inputs that are received by the touch screen 127 and the LCD panel 128 from the processor 110. In that case, the touch screen 127 and the LCD panel 128 may be controlled by the MICOM 121. The MICOM 121 may also request or instruct the touch screen 127 and the LCD panel 128 to provide a status of the touch screen 127 and the LCD panel 128 to the MICOM 121. Upon completion of the diagnosis mode, the touch screen 127 and the LCD panel 128 may be returned to the same state as at the initiation of the diagnosis mode (i.e., returned to the active state).

The control signal provided to the LCD panel 128 from the MICOM 121 may also instruct the LCD panel 128 to display a test pattern. In an example, the test pattern may include sequentially displaying primary colors (e.g., R, G, B), displaying a test pattern including bars of different colors, etc. Based on the LCD panel 128 correctly displaying the test pattern, a user may diagnose that the LCD panel 128 is operating without an error.

In the diagnosis mode, the touch screen 127 may also be controlled to output a signal upon receipt of a user input on the touch screen 127. For example, in the diagnosis mode, the touch screen 127 may be controlled such that, based on receiving a user input on the touch screen 127, such as a touch, a swipe, etc., the touch screen 127 outputs a user input signal to the MICOM 121 indicating that the user input has been received. Based on receiving the user input signal from the touch screen 127, the MICOM 121 may output a control signal to the WLAN device 131, for example as the data signal 121$s$. In an example, the MICOM 121 may provide a control signal to the WLAN device 131 to control output of a test signal by the antenna 133. Based on receipt of the control signal, the WLAN device 131 may control the antenna 133 to output the test signal. Although not illustrated in FIG. 6, the image forming apparatus 100 may also include a keyboard 140. In that case, the keyboard 140 may be controlled by the MICOM 121 in the diagnosis mode such that, upon receipt of a user input on the keyboard 140, the keyboard 140 may output a user input signal to the MICOM 121. Based on receiving the user input signal from the keyboard 140, the MICOM 121 may output a control signal to the WLAN device 131 in a similar manner as described above.

In an example in which the CODEC 123 and the speaker 125 are provided in the example of FIG. 6, the MICOM 121 may also output a control signal to the CODEC 123, for example as the data signal 121$s$, based on receiving the user input signal from the touch screen 127 or based on receiving the user input signal from the keyboard 140, if the keyboard 140 is provided. In that case, the speaker 125 may be controlled to output a sound based on receipt of the data signal 121$s$ by the CODEC 123 from the MICOM 121. Thus, the diagnosis mode may also include testing an operation of the CODEC 123 and the speaker 125.

In the example of FIG. 6 in which the CODEC 123 and the speaker 125 are provided, the diagnosis mode may include receiving a test signal by the antenna 133, for example from an external source. In that case, the reception function of the antenna 133 may also be tested. For example, in the diagnosis mode, the antenna 133 may receive a test signal from an external source, such as a mobile terminal, a desktop terminal, and the like. Based on receiving the test signal, the antenna 133 may provide an output signal to the WLAN device 131, which in turn may provide a data signal to the MICOM 121. For example, the data signal 121$s$ may be a bidirectional signal that may be received by the MICOM 121 from the WLAN device 131. Upon receipt of the data signal from the WLAN device 131, the MICOM 121 may control the CODEC 123 to output an analog sound signal to the speaker 125. Based on the speaker 125 outputting a sound, a user may diagnose a reception function of the antenna 133.

The diagnosis mode may terminate upon an expiration of a certain time after receipt of the user input signal from the touch screen 127 (or the keyboard 140) or upon a subsequent selection of the diagnosis button 130. In an example in which the reception function of the antenna 133 is also tested, the diagnosis mode may terminate upon an expiration of a certain time after receipt of a test signal by the antenna 133. For example, the diagnosis mode may terminate if a user input signal is not received from the touch screen 127 or an output signal is not received from the antenna 133 for 10 seconds, or upon a second press of the diagnosis button 130.

In the example of FIG. 6, although the signaling between the ASIC 111 and the WLAN device 131, including the USB_DATA+ signal 111*e* and the USB_DATA− signal 111*f*, is interrupted by the MICOM 121 during a diagnosis mode, the WLAN device 131 remains able to output a signal by using the USB_DATA+ signal 121*e* and the USB_DATA− signal 121*f* that are provided by the MICOM 121. In that case, a user may enter the diagnosis mode and diagnose a source of an error. For example, in a case in which the control panel 120 enters the diagnosis mode, a user may provide an input on the touch screen 127 (or the keyboard 140 if provided) and diagnose if a test signal is output by the antenna 133. If the test signal is output by the antenna 133, the user may diagnose that the MICOM 121, the touch screen 127, the WLAN device 131, and the antenna 133 operate properly and that the source of the error is not the control panel. Similarly, based on the LCD panel 128 correctly displaying the test pattern, a user may diagnose that the LCD panel 128 is operating without an error. In other examples in which the CODEC 123 and the speaker 125 are provided, a reception function of the antenna 133 may also be tested. In these cases, an unnecessary removal and disposal of the control panel 120 may be avoided based on detecting that the source of the error is the processor 110. On the other hand, if the test signal is not output by the antenna 133, the LCD panel 128 does not output a test pattern, or the speaker 125 does not output a sound, the user may diagnose that the MICOM 121, the touch screen 127, the LCD panel 128, the WLAN device 131, or the antenna 133 does not operate properly and that the source of the error is the control panel 120.

It should be noted that in other examples, the WLAN device 131 illustrated in FIG. 6 as an output device may similarly be implemented by a Bluetooth device, a near field communication device, etc. In those cases, the example process of the diagnosis mode as described above would be substantially the same although the protocol of the signaling may change.

Figure 7:
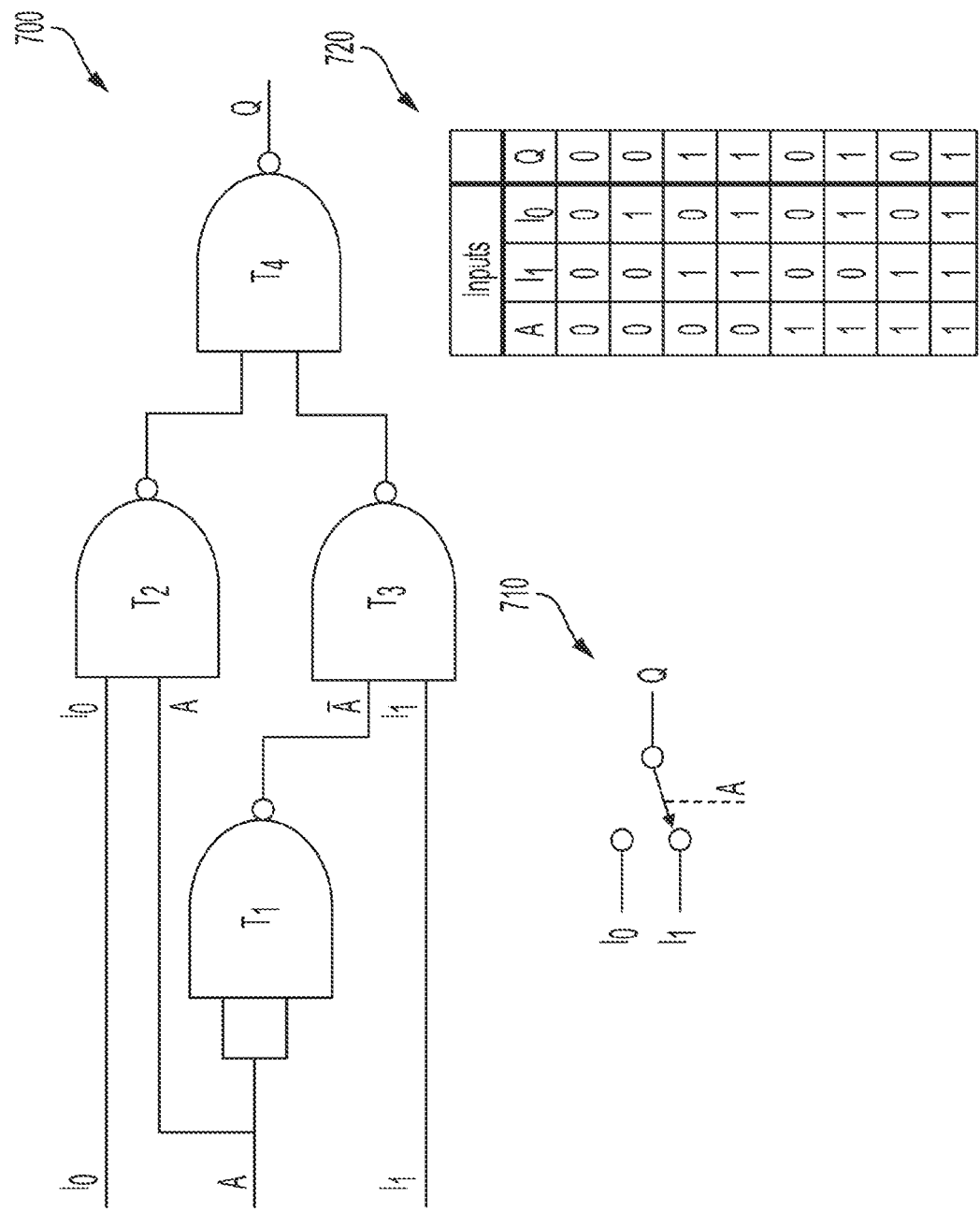
FIG. 7 is a circuit diagram of digital logic gates to selectively provide an output, according to an example.

FIG. 7 is a circuit diagram of digital logic gates to selectively provide an output signal according to an example.

Referring to FIG. 7, a digital logic circuit 700 may include a first NAND gate $T_1$, a second NAND gate $T_2$, a third NAND gate $T_3$, and a fourth NAND gate $T_4$. In an example, the digital logic circuit 700 may be implemented as an alternative to a single channel multiplexer, such as the single channel multiplexer 1291 or 1292 as illustrated in the example of FIG. 3.

In the example of FIG. 7, each of the first through fourth NAND gates $T_1$-$T_4$ are two input NAND gates. Both inputs of the first NAND gate $T_1$ may receive a select signal A such that the output of the first NAND gate $T_1$ is $\overline{A}$. In comparison to the example illustrated in FIG. 3, the select signal A may have a similar function to the select signal 121*d*.

A first input of the second NAND gate $T_2$ is the select signal A and a second input of the second NAND gate $T_2$ is a first input signal $I_0$. In comparison to the example illustrated in FIG. 3, the first input signal $I_0$ may have a similar function to the ASIC Wclk 111*a* or the ASIC Bclk 111*b*.

A first input of the third NAND gate $T_3$ is the signal $\overline{A}$ output by the first NAND gate and a second input of the third NAND gate $T_3$ is a second input signal $I_1$. In comparison to the example illustrated in FIG. 3, the second input signal $I_1$ may have a similar function to the MICOM Wclk 121*a* or the MICOM Bclk 121*b*.

A first input of the fourth NAND gate $T_4$ is received from the output of the second NAND gate $T_2$ and a second input of the fourth NAND gate $T_4$ is received from the output of the third NAND gate $T_3$. The fourth NAND gate $T_4$ performs a NAND operation on the received inputs to output a result Q. In comparison to the example illustrated in FIG. 3, the result Q may have a similar function to the Wclk 129*a* or the Bclk 129*b* that is output by the first or second single channel multiplexer 1291 or 1292, respectively.

A switch 710 is a schematic representation of the digital logic circuit 700. As illustrated in FIG. 7, the switch 710 may receive the first input signal $I_0$ and the second input signal 11. A position of the switch 710 may be controlled by the select signal A. That is, the select signal A is used to select which of the first input signal $I_0$ and the second input signal h is provided as the output Q.

A truth table 720 illustrates the different binary input states of the first input signal $I_0$, the second input signal $I_1$, and the select signal A and the resultant state of the output Q based on the NAND operations of first through fourth NAND gates $T_4$ through $T_4$. As illustrated in truth table 720, based on the select signal A having a low value (i.e., 0), a value of the output Q will correspond to a value of the second input signal $I_1$. Also as illustrated in truth table 720, based on the select signal A having a high value (i.e., 1), a value of the output Q will correspond to a value of the first input signal $I_0$. Accordingly, the digital logic circuit 700 may be implemented as an alternative to a single channel multiplexer, such as the single channel multiplexer 1291 or 1292 as illustrated in the example of FIG. 3.

Examples of the disclosure have been illustrated and described. However, the disclosure is not limited to the above-described examples, and various changes in form and details may be made without departing from the spirit and scope as defined, by the following claims and their equivalents.

What is claimed is:

1. An image forming apparatus comprising:
a control panel including a liquid crystal display (LCD), a touch screen, a microcontroller, a multiplexer, a coder-decoder (CODEC), and a speaker; and
a processor to control an output of the speaker,
wherein, based on a selection of a diagnosis mode, the microcontroller is configured to:
    interrupt communication between the processor and the output of the speaker,
    record an active state of the CODEC and the touch screen,
    change a state of the multiplexer,
    perform a diagnosis by controlling the speaker to output a sound based on receipt of an input on the touch screen, and
    return the CODEC and the touch screen to the active state upon termination of the diagnosis.

2. The image forming apparatus of claim 1,
wherein the multiplexer is configured to receive a first clock signal and a second clock signal from the processor and to receive a third clock signal and a fourth clock signal from the microcontroller, and
wherein, based on the selection of the diagnosis mode, the microcontroller is configured to change the state of the multiplexer to output the third clock signal and the fourth clock signal received from the microcontroller to the CODEC.

3. The image forming apparatus of claim 1, wherein, based on the selection of the diagnosis mode, the microcontroller is further to control the LCD to display a test pattern.

4. The image forming apparatus of claim 1, further comprising a diagnosis button to select the diagnosis mode.

5. The image forming apparatus of claim 1, further comprising a keyboard,
wherein the microcontroller is further to perform the diagnosis by controlling the speaker to output a sound based on receipt of an input on the keyboard.

6. The image forming apparatus of claim 1, wherein the termination of the diagnosis occurs upon expiration of a certain time after the receipt of the input on the touch screen or based on another selection of the diagnosis mode.

7. An image forming apparatus comprising:
a processor; and
a control panel including a liquid crystal display (LCD), a touch screen, a coder-decoder (CODEC), a speaker, a microcontroller, and a diagnosis button,
wherein, based on a selection of the diagnosis button, the microcontroller is configured to:
interrupt communication between the processor and an output of the speaker,
record an active state of the CODEC and the touch screen,
change a state of a multiplexer,
perform a diagnosis including displaying a test pattern on the LCD and outputting a sound at the speaker based on a touch being received on the touch screen, and
return the CODEC and the touch screen to the active state upon termination of the diagnosis.

8. The image forming apparatus of claim 7, further comprising a keyboard,
wherein, based on the selection of the diagnosis button, the speaker is configured to output a sound based on a touch being received on the keyboard.

9. The image forming apparatus of claim 7,
wherein the processor is configured to provide a first clock signal and a second clock signal to the CODEC to control the speaker, the first clock signal and the second clock signal provided through the multiplexer,
wherein the microcontroller is configured to provide a third clock signal and a fourth clock signal to the CODEC to control the speaker, the second clock signal provided through the multiplexer, and
wherein the microcontroller is configured to control the multiplexer to output the third clock signal and the fourth clock signal based on the selection of the diagnosis button.

10. The image forming apparatus of claim 7, wherein, based on the selection of the diagnosis button, the microcontroller is configured to:
record an active state of the CODEC and the touch screen,
interrupt communication between the processor and the control panel,
perform the diagnosis, and
return the CODEC and the touch screen to the active state upon completion of the diagnosis.

11. The image forming apparatus of claim 10, wherein the completion of the diagnosis occurs upon expiration of a certain time after the touch on the touch screen or based on another selection of the diagnosis button.

12. An image forming apparatus comprising:
a control panel including a microcontroller, an input device, a multiplexer, and an output device; and
a processor to provide a first control signal for the output device to the multiplexer,
wherein the microcontroller is configured to:
receive an input signal to enter a diagnosis mode for the control panel,
interrupt communication between the processor and the output device,
record an active state of the output device,
based on entering the diagnosis mode, provide a second control signal for the output device to the multiplexer, and switch a state of the multiplexer to output the second control signal,
perform a diagnosis by controlling the output device to output a sound based on receipt of an input from the input device, and
return the output device to the active state upon termination of the diagnosis.

13. The image forming apparatus of claim 12,
wherein the input device includes a touch screen or a keyboard, and
wherein the output device includes a speaker, a near field communication device, a Bluetooth device, or a wireless local area network device.

14. The image forming apparatus of claim 12, wherein the second control signal for the output device includes a test signal to test a function of the output device.

\* \* \* \* \*